Oct. 19, 1965

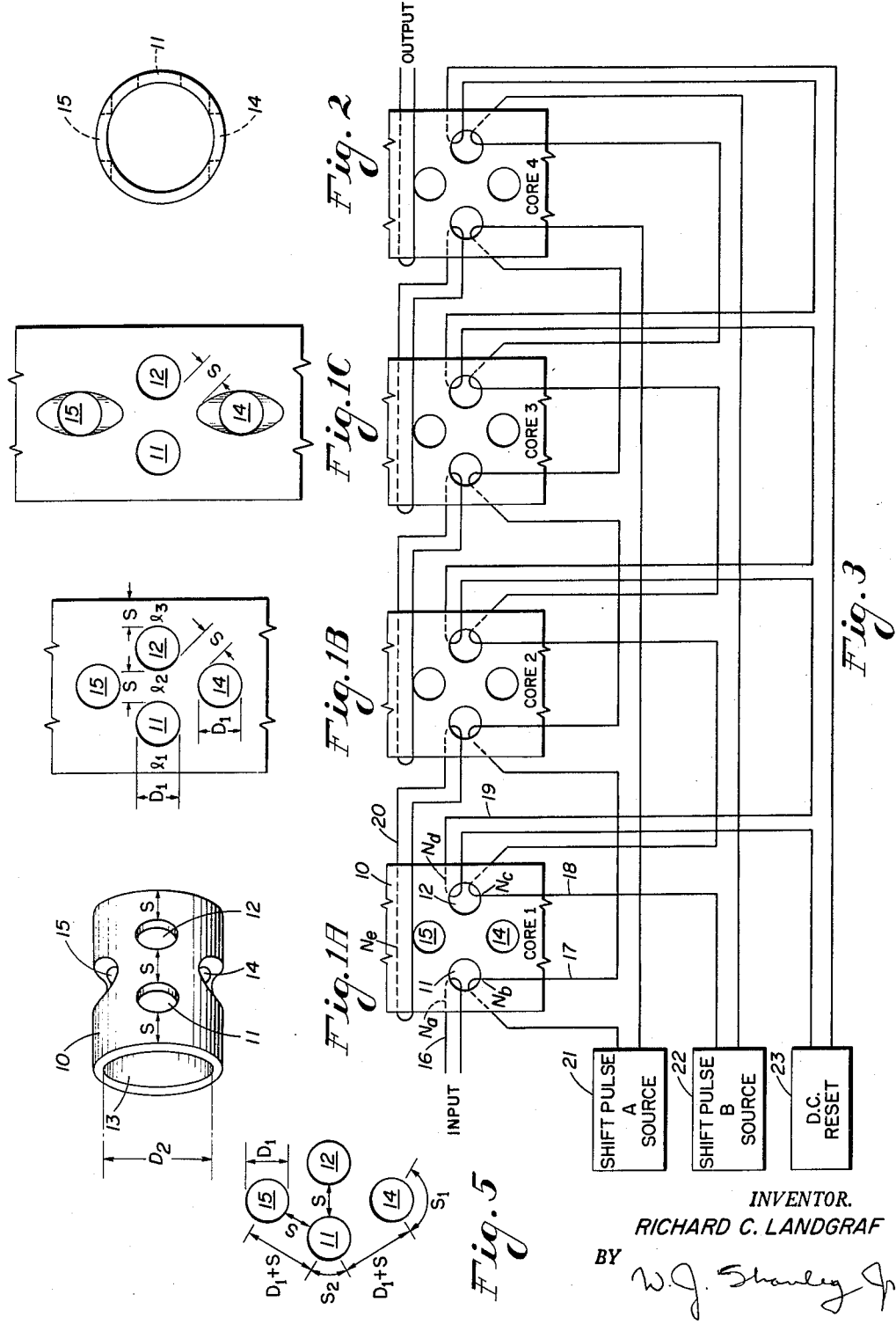

R. C. LANDGRAF
3,213,436

MULTIAPERTURE FERRITE CORE

Filed June 6, 1962      2 Sheets-Sheet 2

|  | ZERO | ONE | ONE | ZERO |
|---|---|---|---|---|
| TIME | CORE 1<br>$l_1$   $l_2$   $l_3$ | CORE 2<br>$l_1$   $l_2$   $l_3$ | CORE 3<br>$l_1$   $l_2$   $l_3$ | CORE 4<br>$l_1$   $l_2$   $l_3$ |
| $T_0$ – INITIAL COND. | ↑ ↑ ↓ | ↓ ↑ ↓ | ↓ ↑ ↓ | ↑ ↑ ↓ |
| $T_1$ – SHIFT PULSE A APPLIED | ↶ | ↶ | ↶ | ↶ |
| $T_2$ – A CEASES | ↑ ↑ ↓ | ↑ ↓ ↓ | ↑ ↓ ↓ | ↑ ↑ ↓ |
| $T_3$ – SHIFT PULSE B APPLIED | ↷ | ↷ | ↷ | ↷ |
| $T_4$ – DURING APP'L. OF B BEFORE T IS GENERATED | ↑ ↓ ↑ | ↑ ↓ ↑ | ↑ ↓ ↑ | ↑ ↓ ↑ |
| $T_5$ – T PULSE GENERATED DURING APP'L. OF B |  |  | ↶ | ↶ |
| $T_6$ – T CEASES DURING APP'L. OF B | ↑ ↓ ↑ | ↑ ↓ ↑ | ↓ ↑ ↑ | ↓ ↑ ↑ |
| $T_7$ – RESET APPLIED | ↷ | ↷ | ↷ | ↷ |
| $T_8$ – FINAL CONDITION | ↑ ↑ ↓ | ↑ ↑ ↓ | ↓ ↑ ↓ | ↓ ↑ ↓ |
|  | ZERO | ZERO | ONE | ONE |

*Fig. 4*

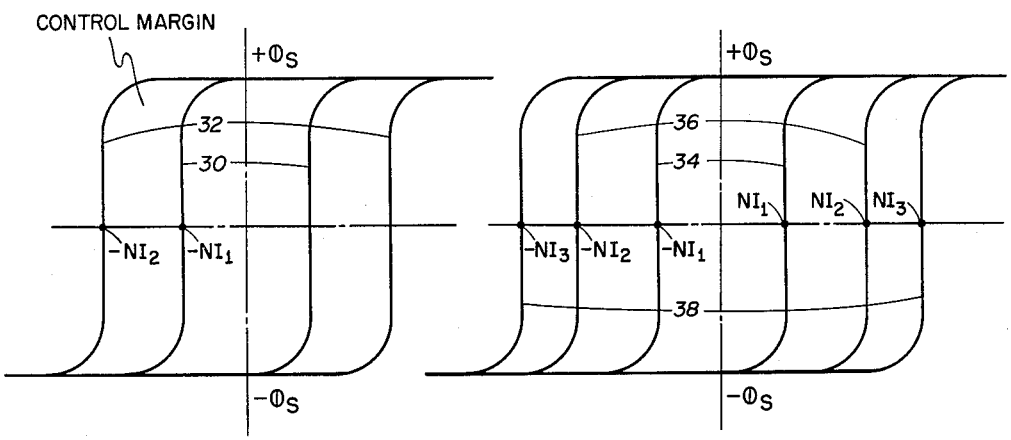

*Fig. 6*          *Fig. 7*

# United States Patent Office 3,213,436
Patented Oct. 19, 1965

3,213,436
MULTIAPERTURE FERRITE CORE
Richard C. Landgraf, Mountain View, Calif., assignor to General Dynamics Corporation, Rochester, N.Y., a corporation of Delaware
Filed June 6, 1962, Ser. No. 200,376
8 Claims. (Cl. 340—174)

This invention relates to magnetic devices and, more particularly, to multiaperture ferrite elements which provide multipath magnetic circuits for use in digital computing circuits.

Multipath ferrite devices have been utilized in magnetic shift registers in order to eliminate unilateral impedance devices, such as diodes, in the transfer loops between the devices. Such diodes were necessary in toroidal magnetic core shift registers to maintain the forward flow of information without any backward flow thereof. Such type shift registers of the prior art fall into two categories: the first type of which requires two devices per stage and the second type of which utilizes only one device per stage.

In the first such type of shift register, the first device of each stage is provided for registering the information held within the stage while the second device of each stage is utilized as a temporary storage during the shifting of information between stages. In the second type of shift register, only one core device per stage is necessary, but such devices are subject to spurious transfer between stages if the magnitude of the pulses applied to control the shifting of the information or if the magnitude of the transfer pulses between devices are not within a predetermined range of magnitudes.

It is, therefore, an object of my invention to provide magnetic core devices capable of registering information therein and thereafter shifting the information out of the device to succeeding devices under control of control pulses which may vary over a considerable range of amplitude without introducing spurious transfer of information between stages during the shifting operation.

In accordance with the present invention, a magnetic core device is shaped so as to provide a plurality of magnetic legs, each of which is common to at least two magnetic paths, the lengths of which differ from each other by an order of magnitude. Thus, in accordance with the invention, the core is so shaped that the two magnetic paths connected in common through a single leg have lengths which may be independently selected so as to provide the desired control margin with respect to the control pulse applied to the winding linking the common leg, without interfering with or requiring a compromise with respect to the various path lengths connected in common to other legs of the device.

It is, therefore, a general object of this invention to provide a novel and improved magnetic element capable of use as a controlling or computing element.

It is another object of this invention to provide a new and improved magnetic core device capable of being employed as a register of binary information which can be shifted within the core under control of control signals applied thereto.

Further objects and advantages will become apparent hereinafter during the detailed description of the embodiments of the invention which are to follow and, which, are illustrated in the accompanying drawings wherein:

FIG. 1A is a perspective view of a novel magnetic element embodying the invention;

FIG. 1B is a developed view of the inside wall of the magnetic element of FIG. 1A;

FIG. 1C is a developed view of the outside wall of the magnetic element of FIG. 1A;

FIG. 2 is an end view of the magnetic element of FIG. 1A;

FIG. 3 is a schematic representation of a magnetic shift register employing magnetic elements of the type shown in FIG. 1A;

FIG. 4 is a table of representations of various flux configurations present in three legs of each device in the shift register of FIG. 3;

FIG. 5 is a more detailed developed view of the inside wall of the magnetic device of FIG. 1B illustrating the length of one of the multiple paths linking legs $l_1$ and $l_3$ in the magnetic device;

FIG. 6 is a plot of typical hysteresis characteristics of the two paths connected in common across leg $l_2$; and FIG. 7 is a plot of typical hysteresis characteristics of the three paths connected in common across leg $l_3$.

Referring now to FIG. 1A, the basic configuration of magnetic element 10 will be described in conjunction with this figure. The magnetic material employed for magnetic element 10 preferably has a substantially square hysteresis loop characteristic. The magnetic material may be in the form of a toroid, or ring, having a substantial thickness or height. Element 10 is shown with a pair of spaced apart circular apertures 11 and 12. Apertures 11 and 12 are of equal diameter $D_1$ (referring to FIG. 1B) while the diameter of the large central aperture 13, which creates the annular shape of the body, has a diameter of $D_2$. Apertures 11 and 12 are spaced from each other and from the nearest edge of element 10 a distance $s$ to thus create legs $l_1$, $l_2$ and $l_3$ (FIG. 1B).

Referring now to FIG. 1B, apertures 14 and 15 are positioned so that each aperture is spaced from apertures 11 and 12 a distance approximately equal to $s$. Apertures 14 and 15 may be created by removing a cylindrical portion of body 10 so that the cross-sectional area of the portion of the body remaining between each of apertures 14 and 15 and apertures 11 and 12 will be equal to the cross-sectional area of legs $l_1$, $l_2$ and $l_3$. The diameters of apertures 14 and 15, as measured at the inside wall of body 10, are approximately equal to $D_1$.

Referring now to FIG. 3, which utilizes the view of FIG. 1B, four cores are illustrated as being connected in cascade. Each of the four cores has an input winding 16 of turns $N_a$ and a first shift winding 17, of turns $N_b$, both of which link body 10 through aperture 11. In addition, each core has a reset winding 19 of turns $N_d$ and a second shift winding 18 turns of $N_c$, both of which link body 10 through aperture 12. Output winding 20 of turns $N_e$ of each core, which is directly connected to the input winding 16 of the next succeeding core, links body 10 through large aperture 13.

The ZERO condition of a core is represented by saturation flux set in the upward direction in legs $l_1$ and $l_2$ and in the downward direction in leg $l_3$. The condition representative of ONE consists of saturation flux set in the downward direction in legs $l_1$ and $l_3$ and in the upward direction in leg $l_2$.

As an aid in explaining the operation of the core device of FIG. 1A, reference may be had to FIG. 4, which is a table of flux patterns which will hereinafter be utilized to explain the operation of a plurality of devices, of the type shown in FIG. 1A, as a shift register.

Since core 1 has a ZERO stored therein, reference may be had to the flux patterns under the heading of "Core 1" in FIG. 4 to facilitate an understanding of the various stable flux patterns which are created in response to the successive application of a first and second shift pulse and a reset voltage to a device in its ZERO condition.

The first shift pulse, hereinafter referred to as shift pulse A, which is applied to winding 17 by source 21 at time $T_1$, is in a direction tending to switch flux in a clockwise direction around aperture 11. Since leg $l_1$ is saturated in its upward direction at time $T_0$, the shift pulse merely tends to drive it further into saturation and does not effect a switching of flux in leg $l_1$. However, in leg $l_2$, the field created by the first shift pulse is in the direction opposite to the flux in leg $l_2$ at time $T_0$. The closed loop of flux linking leg $l_2$ encircles aperture 13, since legs $l_1$ and $l_2$ are both saturated in the same direction at $T_0$. The ampere turns of the shift pulse A is only sufficient to switch flux in the path around aperture 11 but is insufficient to switch flux around aperture 13. Consequently, no flux will be switched in leg $l_2$. Therefore, no switching takes place in either leg $l_1$ or $l_2$ in response to shift pulse A and the flux pattern at $T_2$ will be the same as the initial condition at $T_0$.

Upon application of the second shift pulse, hereinafter referred to as shift pulse B, to winding 18 by source 22 at time $T_3$, the flux in legs $l_2$ and $l_3$ is switched around aperture 12 since the second shift pulse is in a direction tending to switch flux in a counterclockwise direction around aperture 12. Thus, since the flux around aperture 12 after time $T_2$ was in the clockwise direction, the application of the B pulse caused this flux to switch in the counterclockwise direction around aperture 12 to give the pattern at time $T_4$. The ampere turns of the second switch pulse is sufficient to not only shift flux around small aperture 12 but, in addition, is of sufficient magnitude to switch flux around large aperture 13.

Assuming now that no information is applied to input winding 16 at time $T_5$, no flux will be switched in legs $l_1$, $l_2$ and $l_3$. Therefore, the flux pattern at $T_6$ remains the same as at $T_4$. When shift pulse B ceases at $T_7$, the reset current applied to reset winding 20 by D.C. reset source 23 becomes effective to switch flux in a clockwise direction around aperture 12. The condition represented at $T_8$ is the final condition which is the flux pattern representative of ZERO.

A D.C. reset voltage may be utilized instead of a reset pulse in order to dispense with the requirement for an additional pulse source. However, this necessitates that the shift pulse B, which tends to switch flux in a direction in opposition to the direction which the reset current tends to switch flux, be of sufficient magnitude to switch saturation flux either around aperture 12 or around aperture 13 in the presence of the D.C. reset voltage. In addition, if a D.C. reset voltage is utilized instead of an intermittent reset pulse, the ampere turns of the shift pulse A must be sufficient to be able to switch saturation flux around aperture 11 during a time that the D.C. reset current is applied to reset winding 18.

However, it will be recognized that if it is desirable to minimize the ampere turns of shift pulses A and B, a reset pulse may be applied to reset the cores after the termination of shift pulse B.

Assuming now that the digit ONE is stored in the core of FIG. 1A and the information is shifted under control of shift pulses A and B and thereafter the device is reset, the flux patterns created will be identical to those assigned to core 2 in FIG. 4. Since the core is in the ONE condition, the leg $l_1$ is saturated in the downward direction rather than the upward direction as is the case when a ZERO is stored therein. Consequently, when shift pulse A is applied to winding 17, the field created by this pulse will be in a direction tending to switch the flux around aperture 11 in the clockwise direction. Since the flux in legs $l_1$ and $l_2$ at time $T_0$ are in the opposite directions and tend to establish flux in the counterclockwise direction, the shift pulse A will cause flux to be switched around aperture 11. Consequently, after the shift pulse A ceases at time $T_2$, leg $l_1$ is saturated in the upward direction, while legs $l_2$ and $l_3$ are saturated in the downward direction. Therefore, when the shift pulse B is applied to winding 18 at $T_3$, no switching will take place in leg $l_2$ since the shift pulse tends to merely drive it further into saturation. However, the field generated by the shift pulse B is in opposition to the direction of saturation of leg $l_3$, thereby tending to switch the flux over the path around aperture 13. As was hereinbefore indicated, the shift pulse B is of proper ampere turns to be able to switch the direction of saturation of flux in leg $l_3$ over the longer path around aperture 13. The switching of flux, to change from a condition of saturation in the downward direction to a condition of saturation in the upward direction, causes a transfer pulse T to be generated at time $T_5$ by output winding 20 to transfer the information out of the core device. After the T pulse ceases but before the B shift pulse closes, the flux patterns will be as is illustrated at time $T_6$. Therefore, after the transfer of the information out of the core and after shift pulse B ceases, the core will be automatically reset to the ZERO condition by the D.C. current flowing from reset source 23. This current is the proper direction and magnitude to cause flux to be switched around aperture 12 in legs $l_2$ and $l_3$. This results in the flux pattern illustrated at $T_8$ in which legs $l_1$ and $l_2$ are saturated in the upward direction while leg $l_3$ is saturated in the downward direction. As was hereinbefore pointed out, this is representative of the ZERO condition.

Thus, to summarize the action of the device of FIG. 1 when a ZERO is registered in the device, no switching takes place in response to the shift pulse A and, in addition, no switching around aperture 13 takes place in response to switch pulse B and, consequently, no information is generated in output winding 20. After shift pulse B ceases, the core is reset to its ZERO condition.

When ONE is initially registered in the device, switching around aperture 11 takes place in response to the shift pulse A and switching around aperture 13 takes place in response to the shift pulse B. Thereafter, the core is reset to its ZERO condition. Such type action is particularly useful in shift registers wherein information has to be registered and temporarily stored within the device so that the device is free to receive additional information being applied to its input while at the same time it is transferring the temporarily stored information to its output coil for application to the next succeeding stage of the shift register.

Since shift registers are designed to register information under control of shift pulses, the information is shifted within the register without adding or subtracting any information to the information contained therein during the shifting operation. Thus, when utilizing such magnetic core devices as elements of a shift register, care must be taken to assure that the shift pulses applied to control the shifting of information within the register does not result in the introduction of spurious information into the register during the shifting operation. This is accomplished in accordance with the invention by the unique configuration of the core device of my invention which provides at least two magnetic paths of differing lengths for each of legs $l_1$, $l_2$ and $l_3$.

Leg $l_2$ is the common portion of two possible paths over which flux may be switched in response to shift pulse A being applied to shift pulse winding 17. The first path is around aperture 11 while the second path is around aperture 13, i.e., around the core. The reluctance of the magnetic path is $$R = \frac{l}{\mu A}$$

where $l$ is equal to the path length, A its area, and $\mu$ its permeability. Thus, assuming that A and $\mu$ are equal, the reluctance of the two paths is directly related to the length of the path. Therefore, the ratio of these two path lengths will determine the control margin with respect to shift pulse A. To obtain reliable operation, this control margin should be wide enough to assure that shift pulse A will be of sufficient magnitude to reliably switch flux around aperture 11 while being insufficient in magnitude to switch flux around aperture 13.

In accordance with the invention, the control margin may be made as large as possible consonant with the requirements concerning the diameter of the core without resulting in a compromise with respect to core dimensioning necessary to obtain the proper control margin with respect to shift pulse B. Therefore, the ratio of the diameter of aperture 13 to the diameter of aperture 11 may be increased to the point necessary to give an adequate control margin with respect to the operation of shift pulse A.

Referring now to FIG. 6, which shows the B–H curves of the two different magnetic paths coupled in common to leg $l_2$, B–H curve 30 is the hysteresis curve of the path around aperture 11, while curve 32 is the B–H curve of the path around aperture 13. The points at which the curves cross the B axis are $+\phi_S$ and $-\phi_S$, the saturation flux in the upward and downward directions, respectively, of leg $l_2$. The point at which curve 30 crosses the NI axis is $-NI_1$ which is the threshold level above which the magnetizing force must go in order to switch flux in leg $l_2$ around aperture 11 when $l_2$ is saturated in its upward direction. Point $-NI_2$ is the point at which curve 32 crosses the NI axis. Thus, it is the threshold point beyond which a pulse must drive leg $l_2$ in order to be sufficient to switch flux around aperture 13. Since shift pulse A is not supposed to switch flux around aperture 13, the distance between $-NI_1$ and $-NI_2$ defines the control margin within which shift pulse A should fall in order to assure proper operation. Consequently, when shift pulse A is applied to a core in its ZERO condition, i.e., the condition in which legs $l_1$ and $l_2$ are both saturated in the upward direction, it is obvious that the only path over which flux may be switched in leg $l_2$ requires that it be switched around aperture 13, but since the shift pulse A is insufficient in magnitude to switch flux around the path around aperture 13, no flux will be switched in leg $l_2$.

However, when the core is in its ONE condition, leg $l_1$ is saturated in the downward direction while leg $l_2$ is saturated in the upward direction. Consequently, the magnetizing field generated by shift pulse A is in a direction tending to switch the flux in leg $l_2$ around aperture 11.

Referring now to FIGS. 3 and 4, there is shown, respectively, the connection of a plurality of devices of my invention in cascade to provide a new and improved shift register and the particular flux patterns established in the shift register throughout a single shift operation. The shift register of FIG. 3 is illustrated as containing the number ZERO ONE ONE ZERO. This particular pattern of information was selected since it demonstrates all of the possible combinations of transferring information between one core device and the next succeeding core device in the register except for the transfer between one stage having a ZERO therein and the next succeeding stage also having a ZERO therein. The latter was not illustrated since it is obvious that there is no interaction between the two stages under those circumstances due to the lack of a transfer pulse from the output of the first stage to the input of the second stage.

At time $T_0$, cores 1 and 4 are illustrated as having legs $l_1$, $l_2$ and $l_3$ saturated in a pattern representative of ZERO, while cores 2 and 3 have the corresponding legs in a pattern representative of ONE. At time $T_1$, shift pulse A is applied simultaneously to each core to generate a field in legs $l_1$ and $l_2$ in a clockwise direction around aperture 11. As was previously pointed out, shift pulse A results in starting to switch flux around aperture 11 at time $T_1$ in those cores in which the flux pattern is such that leg $l_1$ is saturated in the downward direction while leg $l_2$ is saturated in the upward direction (ONE condition). Cores 2 and 3 will have flux switched around aperture 11 in response to shift pulse A while no switching will take place in cores 1 and 4. Consequently, switching took place around apertures 11 in cores 2 and 3. Thus, the $l_2$ legs in cores 2 and 3 are saturated in the downward direction at time $T_2$.

At time $T_3$, shift pulse B is applied to winding 18 which links the body through aperture 12. As was hereinbefore pointed out, the second shift pulse is in a direction tending to switch flux in a counterclockwise direction and is of sufficient magnitude to not only switch flux around aperture 12 but it is also capable of switching flux around aperture 13.

The flux patterns which shift pulse B tends to initially establish in cores 1–4 are illustrated at time $T_4$. However, when a core has a ONE registered therein, the switching around aperture 13, which is generated by shift pulse B, results in generating a transfer pulse in winding 20 which is applied to input winding 16 of the next stage. This pulse is of a magnitude and direction to tend to switch flux in a counterclockwise direction around aperture 11 and is of sufficient magnitude to switch flux around aperture 13. Transfer pulse T thus generates, at time $T_5$, fields in cores 3 and 4, around apertures 11, which results in switching the flux in leg $l_1$ in a downward direction to thereby register a ONE in cores 3 and 4. Legs $l_2$ of cores 3 and 4 are not switched to be saturated in the upward direction since the B shift pulse holds these legs saturated in the downward direction until after the T pulse ceases. The turns ratio $N_e/N_a$ of output windings 20 versus input winding 16 of each core is adjusted so that, when flux switches around aperture 13 when leg $l_3$ is being switched from saturation in the downward direction to saturation in the upward direction, pulse T will be generated and be of sufficient magnitude to switch flux in legs $l_1$ of cores 3 and 4 from saturation in the upward direction to saturation in the downward direction. It is therefore evident that transfer pulse T must be of sufficient ampere turns to switch flux around aperture 13, since shift pulse B prevents the switching of flux in leg $l_2$ thus requiring the switching to take place around aperture 13. After the transfer operation ceases and before shift pulse B ceases, legs $l_1$–$l_3$ of cores 1–4 assume the condition illustrated at time $T_6$. It is noted that the flux patterns at this time are characterized by legs $l_1$ of cores 1 and 2 being saturated in the upward direction, while legs $l_1$ of cores 3 and 4 are saturated in the downward direction.

After shift pulse B ceases, the D.C. reset applied from source 23 generates a field at time $T_7$ tending to switch flux around aperture 12 in a clockwise direction. Thus, switching takes place around aperture 12 of each core since leg $l_2$ of each core is saturated in the downward direction while leg $l_3$ is saturated in the upward direction. Resetting of the core thus takes place automatically upon the cessation of shift pulse B. Time $T_8$ represents the stable reset flux conditions in legs $l_1$, $l_2$ and $l_3$ of cores 1–4 after the completion of a single shifting operation wherein all information in the register is shifted one stage to the right.

The previous discussion with respect to the two paths connected in common to leg $l_3$ referred to the path around aperture 12 as well as the longer path around aperture 13. However, this discussion ignored the yet still longer path linking leg $l_3$ with leg $l_1$ around the extremities of apertures 11, 12, 14 and 15. Thus, leg $l_3$ of each core is connected in common with three different length paths over which switching of flux can possibly occur. Depending upon the previous condition of magnetization of each path, flux will be switched over the shortest of these paths which can be switched in response to shift pulse B. Therefore, since the shortest of the three paths is the mean path length around aperture 12, switching will occur around aperture 12 when leg $l_2$ is saturated in the upward direction and leg $l_3$ in the downward direction, since these directions create flux that may be switched around aperture 12 by shift pulse B. For example, referring now to FIG. 4, core 1 will switch around aperture 12 in response to shift pulse B. No switching will take place around aperture 13 of core 1 since the reluctance of the mean path around aperture 12 is less than the mean path length around aperture 13. Therefore, switching will first occur over the shorter path length around aperture 12 and will saturate leg $l_3$. Accordingly, no further flux can pass through leg $l_3$ and therefore no flux is available for the path around aperture 13.

FIG. 7 illustrates the hysteresis curve of the three possible paths over which saturation flux of leg $l_3$ may be switched. Leg $l_3$ of each core is saturated in the downward direction, at time $T_2$, and consequently each leg will be at the point on the hysteresis curve where the curves cut the $-\phi$ axis at $-\phi_S$, i.e., at the saturation flux in the downward direction. Curve 34 is representative of the hysteresis curve of the magnetic path around aperture 12, while curve 36 represents the hysteresis curve of the magnetic path around aperture 13. Curve 38 represents the hysteresis curve around the longest path which links legs $l_1$ and $l_3$. Shift pulse B is sufficient in magnitude to generate a field of sufficient ampere turns to cause switching over the mean path around aperture 13. Shift pulse B must be capable of driving leg $l_3$ to exceed the value $NI_2$, and yet still be less than $NI_3$ which is the point at which saturation flux in leg $l_3$ could be switched over the longest path. However, even if the ampere turns of shift pulse B exceeds point $NI_3$, no switching will take place over the longest path as long as the path length around aperture 13 is less than the path length around the four apertures. Switching will thus start to occur first over the shorter of the two paths and switching will be completed over this path even though switching might have started to occur over the longer path due to shift pulse B exceeding $NI_3$. This switching cannot occur since leg $l_3$ will have been saturated in the upward direction over the shorter of the two path lengths, and no more flux will be available to cause switching over the longer path length around the four small apertures. No switching of leg $l_1$ can occur over the longer path length due to the fact that switching is bound to occur first over the shorter path length thus precluding the further switching over longer common connected path lengths. Therefore, in accordance with my invention, the magnitude of the second shift pulse may be increased so as to speed up the rate of switching without resulting in spurious switching over undesired paths.

Referring now to FIG. 5, a more detailed showing of the dimensions between apertures 11, 12, 14 and 15 and the minimum path length around these apertures indicates that the minimum path length L around apertures 11, 12, 14 and 15 works out to be $$L = (4+\pi)D_1 + 4S$$

Thus, L should be large with respect to the mean path length around aperture 13. Either $D_1$, which is the diameter of the small apertures, or S, which is the spacing between apertures, should be large. However, since it is desirable that $D_1$ be small with respect to $D_2$, which is the diameter of aperture 13, in order not to interfere with the control margin with respect to shift pulse A, it can be seen that the path length L with respect to the path length around aperture 13 may be increased by increasing the distance between the apertures. Consequently, the distance between apertures 11 and 12 and the corresponding distance between the nearest edge may be large relative to the total overall height of the annular ring in order to provide the proper control margin with respect to shift pulse A and to make sure that flux will switch around aperture 13 in response to the application of shift pulse B to preclude switching around the four small apertures.

There have been described improved magnetic circuits useful in registering and shifting of information in response to the establishment and switching of multipath flux patterns.

While I have shown and described a specific embodiment of my invention, other modifications will readily occur to those skilled in the art. For example, the portion of body 10 removed to provide apertures 14 and 15 can be enlarged so that these apertures merge into one large aperture which extends completely around the periphery of body 10 thus breaking the path linking legs $l_1$ and $l_3$ of the core around the outside of the four apertures. Thus, legs $l_1$ and $l_3$ can no longer be connected over such a path length thereby removing the requirements which dictated increasing the height of the toroid so as to make the total path length L large with respect to the mean circumference of the path around aperture 13.

I do not, therefore, desire my invention to be limited to the specific arrangement shown and described, and I intend in the appended claims to cover all modifications within the spirit and scope of my invention.

What is claimed is:

1. A magnetic core device comprising a body of ferrite material having a substantially rectangular hysteresis loop characteristic, the body being of substantially annular shape and at least two generally circular apertures in said body, the axes of which extends in a radial direction from the axis of revolution of said body, said apertures being smaller in diameter than the large centrally located aperture which creates the annular shape of said body, both of said axes of said smaller apertures and a line intersecting said smaller aperture axes and perpendicular thereto lying in a single plane, said line and each of said smaller aperture axes having different points of intersection with each other, each of said smaller apertures being spaced from the other smaller aperture and the nearest end surface of said body, measured in a longitudinal direction, an equal distance to thereby provide the body with three substantially equal cross-sectional areas lying in said single plane.

2. A magnetic core device comprising a body of ferrite material having a substantially rectangular hysteresis loop characteristic, the body being of cylindrical shape having opposite ends and having a large centrally located aperture, the axis of which coincides with the axis of revolution of the body, said body having first and second smaller generally circular apertures, the axes of which lie in a first plane which extends in a radial direction from said axis of revolution, said first and second apertures being spaced from each other along a line between the opposite ends of the body so as to provide first, second and third legs having three equal cross-sectional areas lying in said first plane.

3. The invention as set forth in claim 2 further comprising third and fourth smaller apertures created by removing first and second portions of said body such that the minimum cross-sectional area of the body remaining between each of said first and second portions and each of said first and second apertures are each substantially equal to the cross-sectional area of any one of said three equal cross-sectional areas.

4. The invention as set forth in claim 3 futher comprising an input winding linking the core through said first aperture, a first shift winding linking the core through said first aperture, a second shift winding linking the core through said second aperture, and an output winding linking the core through said large aperture.

5. The invention as set forth in claim 4 in which said first leg is interposed between one of said opposed ends and said first aperture, said second leg is interposed between said first and second apertures, said third leg being interposed between said second aperture and the other of said opposed ends, said core being in binary ZERO condition when said first and second legs are both saturated in a given direction and said third leg is saturated in the opposite direction to said given direction, said core being in binary ONE condition when said first and third legs are saturated in said opposite direction and said second leg is saturated in said given direction, means for applying a first shift pulse to said first shift winding, said first shift pulse being of a magnitude sufficient to switch flux over a path around said first aperture and a polarity to saturate said second leg in said opposite direction but being of insufficient magnitude to switch flux over a path around said large aperture thus allowing the switching of flux in said core when it is initially in said binary ONE condition in response to said first shift pulse to thereby transfer information from said first leg to said second leg.

6. The invention as set forth in claim 5 further comprising means for applying a second shift pulse to said second shift winding, said second shift pulse being of a magnitude sufficient to switch flux over a path around said large aperture and a polarity to saturate said third leg in said given direction whereby the flux switches around said large aperture in response to the application of said second shift pulse when said second and third legs are saturated in said opposite direction to thereby generate an output pulse in said output winding.

7. The invention as set forth in claim 6 further comprising a reset winding linking the core through said second aperture, and means for applying a reset voltage to said reset winding, said reset voltage being of a magnitude sufficient to switch flux over a path around said second aperture and a polarity to saturate said second leg in said given direction and said third leg in said opposite direction whereby said core is reset to its binary ZERO condition.

8. The invention as set forth in claim 3 in which said cylindrical body has a circular cylindrical shape, the axes of said first and second removed portions of said body are substantially parallel to each other and to the axes of said first and second apertures and lie in a second plane which is parallel to and equidistant from said opposed ends of said body, the removed part of each of said removed portions which lies in said second plane forming a chord of a circle whereby the path connecting said first and third legs must encircle said third and fourth apertures as well as said first and second apertures.

References Cited by the Examiner
UNITED STATES PATENTS 3,004,243  10/61  Rossing et al. _____ 340—174

IRVING L. SRAGOW, *Primary Examiner.*

WALTER W. BURNS, Jr., *Examiner.*